United States Patent [19]

Schenkenberger

[11] Patent Number: 4,594,075

[45] Date of Patent: Jun. 10, 1986

[54] PROCESS FOR SPRAY-DRYING READILY WATER-SOLUBLE DYES AND FLUORESCENT BRIGHTENERS

[75] Inventor: Ernst Schenkenberger, Rheinfelden, Fed. Rep. of Germany

[73] Assignee: Ciba-Geigy Corporation, Ardsley, N.Y.

[21] Appl. No.: 693,392

[22] Filed: Jan. 22, 1985

[30] Foreign Application Priority Data

Jan. 24, 1984 [CH] Switzerland ............................ 297/84

[51] Int. Cl.$^4$ ...................... D06P 5/00; C09B 67/06; D06L 3/12
[52] U.S. Cl. ............................................ 8/499; 8/436; 8/648; 8/654; 8/657; 8/673; 8/676; 8/681; 8/919
[58] Field of Search ............................................ 8/499

[56] References Cited

U.S. PATENT DOCUMENTS

| | | | |
|---|---|---|---|
| 4,285,692 | 8/1981 | Schiwy et al. | 8/499 |
| 4,453,943 | 6/1984 | Balliello | 8/524 |
| 4,507,126 | 3/1985 | Balliello | 8/526 |

FOREIGN PATENT DOCUMENTS 1477379  6/1977  United Kingdom .

OTHER PUBLICATIONS

F. Rosenbloom "Spray Drying Improves Processing of Colors for Dyeing", A D R, Aug. 14, 1967, pp. 612 and 613.

*Primary Examiner*—A. Lionel Clingman
*Attorney, Agent, or Firm*—Edward McC. Roberts; Kevin T. Mansfield

[57]   ABSTRACT

A process is described for spray-drying readily water-soluble dyes and fluorescent brighteners from a saturated aqueous solution which contains undissolved dye or fluorescent brightener in a ratio between dissolved and undissolved matter of 1:9 to 9:1.

The free-flowing dye or brightener granulates obtained in this process are distinguished by high bulk density, abrasion resistance and dimensional stability.

8 Claims, No Drawings

PROCESS FOR SPRAY-DRYING READILY WATER-SOLUBLE DYES AND FLUORESCENT BRIGHTENERS

The present invention relates to a process for spray-drying readily water-soluble dyes and fluorescent brighteners, to the dye or brightener granulates obtained in this process, and to their use for the dyeing and fluorescent brightening of textile material, leather or paper.

There are a considerable number of known processes for converting dyes or fluorescent brighteners, which, at the end of the synthesis, are generally in the form of aqueous suspensions or in the form of press cakes, into a solid commercial form. Next to drying, for example in paddle dryers, thin-film contact dryers, fluidised-bed systems or vacuum drying cabinets, a further method has become important, namely the spray-drying method (F. Rosenbloom, ADR, August 1967, p. 15–16). The advantage of this method is that the dry dye or brightener is obtained in the form of granulates which are low in dust, rapidly disintegrate in water, and are easily metered.

There is no need for a mechanical aftertreatment, as, for example, on drying in a paddle dryer. Furthermore, if the spray-drying is carried out with removal of the fines, the resulting granulate will have a narrow particle size distribution.

However, the spray-drying of solutions of readily water-soluble dyes and fluorescent brighteners is problematical in so far as the product is lightweight, fragile granulates or, instead of a granulate, resinous or oily, highly tacky drops which settle out on the walls in the interior of the spray dryer.

German Pat. No. 2,459,895 contains the recommendation that, in the case of low-melting basic dyes, the spray-drying be carried out not with a solution of the dyes but with a suspension thereof in which the dye is present in virtually undissolved form. This can hardly be put into effect with readily water-soluble dyes and brighteners; in addition, the granulates thus produced are frequently not sufficiently fracture- and abrasion-resistant.

It has now been found, surprisingly, that satisfactory granulates are obtained of this type of dye or of fluorescent brightener if they are introduced into the dryer in the form of a saturated aqueous solution which contains a certain amount of undissolved dye or brightener in addition to dissolved dye or brightener.

To obtain an abrasion-resistant granulate it is found to be advantageous to start from solids-containing solutions which contain 20 to 60% by weight, in particular 30 to 40% by weight, based on the total weight of the spray slurry, of diluent-containing or diluent-free dye or brightener. A solution having a dye/brightener content >60% by weight is too viscous and is difficult to pump or spray.

Readily water-soluble dyes or fluorescent brighteners are to be understood as meaning dyes or fluorescent brighteners having a solubility in water of >100 g/l$_{25°C.}$. Suitable dyes are primarily textile dyes of all kinds of chemical classes. They are for example anionic dyes, such as nitro, aminoketone, ketone-imine, methine, nitrodiphenylamine, quinoline, aminonaphthaquinone or coumarin dyes or even acid dyes based on fustic extract, in particular acid anthraquinone and azo dyes, such as monoazo and disazo dyes.

These dyes contain at least one anionic water-solubilising group, for example a carboxyl or in particular a sulfo group. The dyes are generally in their salt form, for example in the form of the lithium, sodium, potassium or ammonium salt.

Also possible are basic, i.e. cationic, dyes. Examples thereof are the halides, sulfates, methosulfates or metal halide salts, for example tetrachlorozincates, of azo dyes, such as monoazo, disazo and polyazo dyes, and of anthraquinone dyes, phthalocyanine dyes, diphenylmethane and triarylmethane dyes, methine, polymethine and azomethine dyes and of thiazole, ketone-amine, acridine, cyanine, nitro, quinoline, benzimidazole, xanthene, azine, oxazine and thiazine dyes.

These basic dyes are commercially available under a wide variety of different names.

In addition to drying acid or basic textile dyes, the present process is suitable in particular for spray-drying water-soluble fluorescent brighteners, primarily, that is, stilbene brighteners, especially those of the bis-triazinylaminostilbenedisulfonic acid, bis-styrylbiphenyl, bis-styrylbenzene and bis-triazolylstilbenedisulfonic acid type The sulfogroup-containing brighteners are preferably in the form of their metal salts, as obtained in the synthesis, for example lithium, potassium, magnesium or especially sodium salts, and as ammonium, amine or alkanolamine salts. It is also possible to use salt mixtures or partially acidified brightener compound or brighteners in the form of the free acid.

The process according to the invention is preferably used to dry sulfogroup-containing stilbene brighteners of the formula

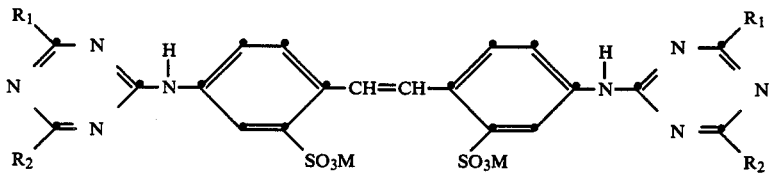

The invention accordingly provides a process for spray-drying readily water-soluble dyes and fluorescent brighteners from a saturated aqueous solution which contains undissolved dye or fluorescent brightener in a ratio between dissolved and undissolved matter of 1:9 to 9:1.

Advantageously, the spray-drying is carried out on a saturated aqueous solution which has a solids content (spray slurry) and in which the ratio of dissolved to undissolved dye/brightener is 1:1 to 3:1. Furthermore, in which
M is hydrogen or an alkali metal, alkaline earth metal, ammonium or amine salt ion, $R_1$ and $R_2$, independently of each other, are $NH_2$, $NH-CH_3$, $NH-C_2H_5$, $N(CH_3)_2$, $N(C_2H_5)_2$, $NH-CH_2-CH_2-OH$, $NH-CH_2-CH_2-OH$, $N(CH_2-OH)_2$, $N(CH_2-CH_2-CH_2OH)_2$, $N(CH_3)(CH_2-CH_2-OH)$, $NH-CH_2-CH_2-O-CH_2-CH_2-OH$, NH—CH$_2$—CH$_2$—CH$_2$—SO$_3$M, OH, OCH$_3$, OCH(CH$_3$)$_2$, O—CH$_2$—CH$_2$—O—CH$_3$,

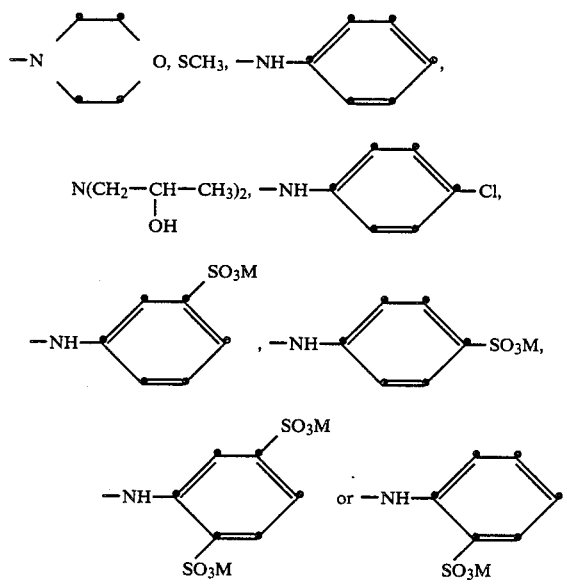

in which
M is hydrogen or an alkali metal, alkaline earth metal, ammonium or amine salt ion, of the formula

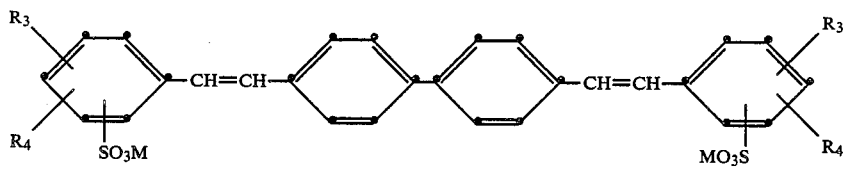

in which
R$_3$ is hydrogen, alkyl having 1 to 4 carbon atoms, alkoxy having 1 to 4 carbon atoms, halogen or SO$_3$M,
R$_4$ is hydrogen or alkyl having 1 to 4 carbon atoms and
M is hydrogen or an alkali metal, alkaline earth metal, ammonium or amine salt ion, or of the formula

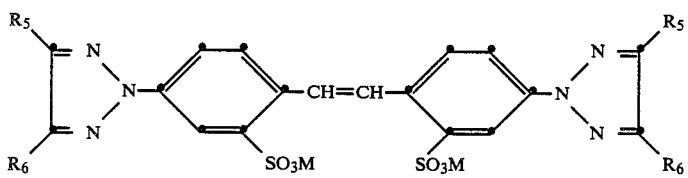

in which
M is hydrogen or an alkali metal, alkaline earth metal, ammonium or amine salt ion, and
R$_5$ and R$_6$, independently of each other, are hydrogen, CH$_3$,

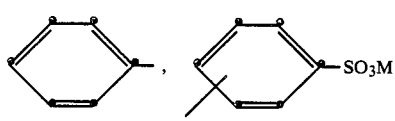

or R$_5$ and R$_6$ together are the complement to a benzene ring.

The spray-drying is carried out in two steps:
(a) readying the solids-containing saturated dye or brightener solution to be atomised;
(b) introducing the saturated solution which contains undissolved dye/brightener into the spray dryer and evaporating the water.

These two steps can be followed by a further step, in particular if no fines are separated off, namely a step in which the dried dye/brightener granulate is dedusted.

The saturated solids-containing dye or brightener solution to be atomised is readied in step (a) either by diluting or concentrating the synthesis suspension of the dye/brightener to the required product content or suspending the dye/brightener press cake in the corresponding amount of water and subsequently thermostatting the suspension (the spray slurry). The ratio of dissolved to undissolved matter (dye or brightener) is controlled via the amount in the spray slurry of material to be dried and the temperature. However, it is also possible to proceed by heating the synthesis suspension or aqueous slurry of the dye or brightener press cake until a clear solution has formed. Any small amount of insoluble byproducts which is present can be easily removed in this manner by filtration. The solution is then gradually allowed to cool down, and some of the dissolved dye or brightener reprecipitates. In the case of compounds having good crystallising properties, precipitates of fine crystals are formed. The predetermined ratio of dissolved to undissolved product is also in this case largely decided by the choice of the final temperature for the dye or brightener solution.

If the starting material is in the form of coarse crystals or the dye-brightener precipitates in the form of coarse crystals when the solution is cooled down, it is advantageous to precede the spray-drying by a wet-milling, for example by means of a stirred ball mill, a pin-disc mill or a sand mill. It is found to be advantageous to add a dispersant to the dye/brightener suspension before the suspension is milled. Suitable dispersants are primarily anionic and nonionic surface-active substances, for example ethylene oxide adducts or formaldehyde condensates of aromatic sulfonic acids. It is frequently sufficient for the crystalline content to be milled down to an average particle size of <100 μm.

The dye or brightener solution with solids content, i.e. the spray slurry, is advantageously thermostatted to between 5° and 50° C., irrespective of whether the dye or brightener was previously brought into solution by heating or was simply merely suspended. Within the temperature range 5° to 50° C. the spray slurry is mobile—its viscosity being within the range 5 to 100 mPa.s—and for that reason it is very readily pumped and easily atomised in the dryer. Temperatures within the range from 15° to 40° C. are found to be particularly favourable, since within that range the viscosity of the spray slurry passes through a minimum. The position of said minimum within this temperature range depends on the respective dye/brightener. The extent of the viscosity minimum, moreover, also varies with the dye or brightener. By setting minimal viscosities it is accordingly possible to spray-dry dye or brightener suspensions having a relatively high product content, this having a favourable effect on the energy balance of the drying.

In many cases it is necessary to add diluents to the suspension in order to standardise the dye or brightener to a commercial strength. These diluents should have the property of being capable of drying under the given conditions and of not interacting with the dye or brightener. Particularly suitable diluents are sodium chloride, potassium sulfate, sodium sulfate, sugar derivatives, for example dextrin, bone glue or ammonium chloride for dyes and ammonium sulfate and anionic dispersants, such as ligninsulfonate or naphthalenesulfonic acid/formaldehyde condensate, for brighteners.

In addition to diluents, the solids-containing dye or brightener solution can of course also have added to it before the spray-drying further assistants which are customarily contained in solid formulations. Examples thereof are antifoams, surface-active agents, for example anionic dispersants, sequestrants or binders for increasing the abrasion resistance of the granulates.

In the spray-drying of step (b), the solids-containing dye or brightener solution (the spray slurry) is introduced into the dryer by way of a device which is suitable for producing drops of the desired size (for example nozzle, atomiser, vibrator or rotating disc). The gas inlet temperature of the dryer is of the order of 200° to 350° C., and the gas outlet temperature 100° to 150°, the atomised material to be dried advantageously moving in the direction of the drying air (cocurrent operation). The drying is carried out in such a way that the product temperature does not exceed a specific critical limit above which the granulate undergoes irreversible changes. The result is a free-flowing granulate which is readily discharged from the dryer and packed.

Compared with the state of the art method of drying in a paddle dryer or vacuum cabinet, the process according to the invention has the following advantages: residual moisture content and particle size can be controlled; the process can be carried out as a continuous operation: there is no need for milling in a mill; the spray-dried granulate has a narrow particle size distribution. In addition, the process treats the product gently, owing to the evaporation effect and the shorter residence time of the dye in the drying apparatus of about 45 seconds, so that there is no agglomeration of the primary particles and the heat stress on the product is very low; furthermore, the process has favourable economics, owing to the elimination of some operations.

The dye or brightener granulates obtained by the process according to the invention, furthermore, are distinguished by high bulk density, abrasion resistance and dimensional stability and low dust levels.

Depending on whether they are dye- or brightener-based, they are used for the dyeing or fluorescent brightening of textile materials, leather or paper.

The following examples serve to illustrate the invention; parts and percentages are by weight. Viscosity measurements were carried out on the Rheomat 115 from Contraves.

EXAMPLE 1

200 parts of press cake (solids content 52% of the fluorescent brightener of the formula

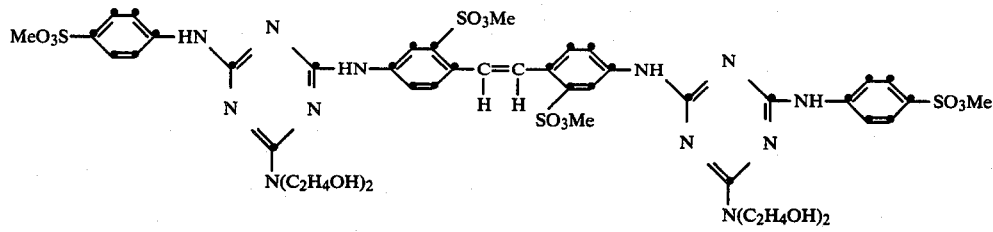

Me = Na; H which is initially in the form of the disodium salt, are suspended in 90 parts of water and are converted into the disodium-dipotassium salt by adding 18 parts of 50% potassium hydroxide solution. The temperature is then raised to 60° C., thereby producing a clear solution which is filtered to separate off minor impurities. On allowing the solution to cool down to a temperature of about 30° C., some of the fluorescent brightener crystallises out, and the solution goes milky, forming a turbid suspension. About 10% of the brightener has reprecipitated at this temperature and is present in the form of fine crystals. The spray slurry has a viscosity of 100 mPa.s (viscosity minimum) and can be satisfactorily spray-dried on a spray nozzle dryer (air inlet temperature about 300° C., air outlet temperature about 120° C.). The resulting granulate is readily discharged from the dryer; no caked product in the tower. Bulk density: about 0.5 kg/l.

If, on the other hand, the clear solution obtained at 60° C. is atomised as described above, this leads to the formation of a tacky, very lightweight powder which cakes to the walls and is difficult to discharge from the drying tower. The bulk density of this powder is only 0.2 to 0.3 kg/l.

EXAMPLE 2

200 parts of press cake (solids content ~50%) of the fluorescent brightener of the formula

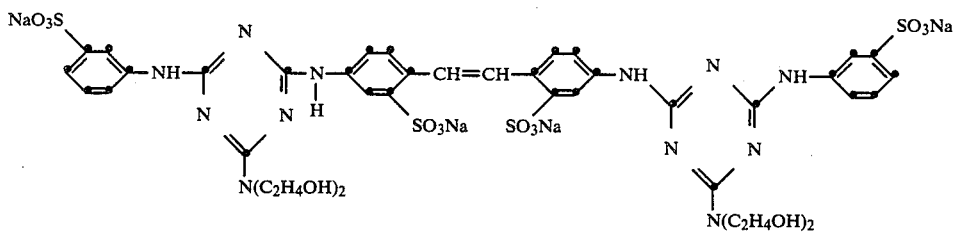

are suspended in 250 parts of water and 45 parts of sodium carbonate and are brought into solution by heating to 60° to 70° C.

Subsequent cooling down to about 35° C. has the effect of producing a milkily turbid solution (a suspension of fine crystals). About 25% of the brightener is present at this temperature in the form of undissolved finely crystalline solid matter. The spray slurry has a viscosity of 7 mPa.s and is easily spray-dried under the conditions given in Example 1. The result is a free-flowing granulate having a bulk density of about 0.4 kg/l.

EXAMPLE 3

Example 2 is repeated, except that 30 parts of sodium chloride are used in place of the 45 parts of sodium carbonate, likewise affording, on spray-drying, a free-flowing granulate which is easily discharged from the dryer.

EXAMPLE 4

200 parts of press cake (solids content ~50%) of the dye of the formula

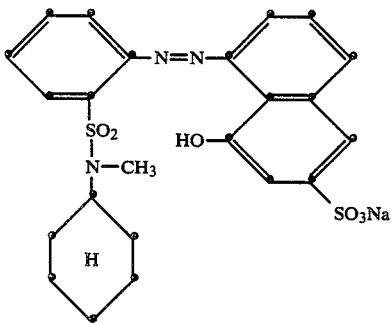

are introduced with stirring into 35 parts of water, together with 6 parts of sodium cumenesulfonate, 4 parts of ethylenediaminetetraacetic acid in the form of the sodium salt and 4 parts of naphthalenesulfonic acid/formaldehyde condensate. The result is a suspension, which is thermostatted to 20° C. At that temperature, about 10% of the dye is in solution, so that, in other words, 90% of the dye is in the form of suspended particles. The suspension is mobile and has a viscosity of about 20 mPa.s (viscosity minimum). Before the spray-drying, the crystalline dye in the suspension is ground down to an average particle size of <100 μm, and the spray slurry thus prepared is subsequently spray-dried as indicated in Example 1. The result is a low-dust abrasion-resistant granulate having a bulk density of >0.5 kg/l.

On raising the spray slurry to temperatures of above 20° C., the viscosity increases rapidly. On atomising a thermostatted suspension of dye at 30° C., the result is a dusty, abrasion-sensitive granulate having a low bulk density, while a warm suspension at 40° C. is so viscous as to be impossible to spray-dry under the customary conditions, owing to nozzle blockage.

I claim:

1. A process for obtaining a dried granulate of a readily water-soluble dye or fluorescent brightener which comprises spray drying a saturated aqueous slurry containing 20 to 60% by weight, based on the total weight of the spray slurry of a diluent-containing or diluent-free dye or brightener, wherein said dye or brightener is distributed between a dissolved and undissolved state in a ratio of said dissolved to undissolved state of 1:9 to 9:1.

2. A process of claim 1, wherein the saturated aqueous slurry contains dissolved and undissolved dye or fluorescent brightener in a ratio of 1:1 to 3:1.

3. A process of claim 1, wherein the aqueous slurry has a temperature of 5° to 50° C. and a viscosity of 5 to 100 mPa.s.

4. A process of claim 3, wherein the temperature of the aqueous slurry is adjusted to a value between 15° and 40° C. at which the viscosity of the slurry is at a minimum.

5. A process of claim 1, wherein the slurry contains 30 to 40% by weight, based on the total weight of the spray slurry, of diluent-containing or diluent-free dye or brightener.

6. A process of claim 1, wherein sulfogroup-containing stilbene brighteners are spray-dried.

7. A process of claim 1, wherein the slurry has diluents added before the spray-drying.

8. The dye or brightener granulate obtained using the process of claim 1.

* * * * *